(12) United States Patent
Hofrichter et al.

(10) Patent No.: US 7,707,606 B2
(45) Date of Patent: Apr. 27, 2010

(54) CONTENT AND APPLICATION DOWNLOAD BASED ON A HOME NETWORK SYSTEM CONFIGURATION PROFILE

(75) Inventors: Klaus Hofrichter, Santa Clara, CA (US); Joseph Alexander Dara-Abrams, Los Altos, CA (US); David Gabriel Gaxiola, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 3 days.

(21) Appl. No.: 12/214,131

(22) Filed: Jun. 16, 2008

(65) Prior Publication Data

US 2008/0255692 A1  Oct. 16, 2008

Related U.S. Application Data

(63) Continuation of application No. 09/705,442, filed on Nov. 2, 2000, now abandoned.

(51) Int. Cl.
*H04N 5/445* (2006.01)
*H04N 7/173* (2006.01)

(52) U.S. Cl. .................. 725/50; 725/80; 725/133; 725/141

(58) Field of Classification Search .............. 725/50, 725/80, 133, 141
See application file for complete search history.

(56) References Cited

U.S. PATENT DOCUMENTS

| | | | |
|---|---|---|---|
| 6,169,725 B1 | 1/2001 | Gibbs et al. | 370/216 |
| 6,177,931 B1 | 1/2001 | Alexander et al. | 345/327 |
| 6,219,839 B1 | 4/2001 | Sampsell | 725/40 |
| 6,470,378 B1 * | 10/2002 | Tracton et al. | 709/203 |
| 6,526,581 B1 * | 2/2003 | Edson | 725/74 |
| 6,618,764 B1 * | 9/2003 | Shteyn | 709/249 |
| 6,658,663 B1 | 12/2003 | Bruynsteen | 725/134 |
| 6,725,036 B1 | 4/2004 | Faccin et al. | 455/433 |

OTHER PUBLICATIONS

Gavron, Jacquelyn, Moran, Joseph, Ziff Davis Press, 1996 How to Use Microsoft Windows NT 4 Workstation, pp. 126-129 and 172-173.
Special Edition Using Netscape 2, Que Corporation, 1995, pp. 862-866.

* cited by examiner

*Primary Examiner*—Hunter B. Lonsberry
(74) *Attorney, Agent, or Firm*—Haverstock & Owens LLP (57) ABSTRACT

A system and method is provided for identifying, accessing, and managing service applications for use with associated consumer electronic devices in a home network system. A client side process, executed by a client computing system in the home network system, operates in conjunction with a server side process executed by a server computing system that is coupled with the client computing system via the Internet. The client computing system is implemented by a gateway device coupled with each of the devices via the home network. The client side process includes the steps of: determining device ID information associated with at least one selected one of the consumer electronic devices in the home network system; determining a home network system configuration profile based at least on the device ID information; providing the home network system configuration profile to a selected server computing system via the Internet; downloading an application from the selected server computing system, the application being operative to provide a process associated with the selected electronic devices; and executing the downloaded application at the gateway device to provide a remote interactive process associated with the selected electronic devices.

40 Claims, 4 Drawing Sheets

CONTENT AND APPLICATION DOWNLOAD BASED ON A HOME NETWORK SYSTEM CONFIGURATION PROFILE

CROSS REFERENCE TO RELATED APPLICATIONS

This application is a continuation of U.S. patent application Ser. No. 09/705,442, filed on Nov. 2, 2000 now abandoned, entitled "CONTENT AND APPLICATION DOWNLOAD BASED ON A HOME NETWORK SYSTEM CONFIGURATION PROFILE,"which is hereby incorporated by reference in its entirety.

Reference is made to U.S. patent application entitled "Residential Gateway System For Managing Service Applications Associated With Electronic Devices", Ser. No. 09/705,472, filed on Nov. 2, 2000, and also to U.S. patent application entitled "Remote Manual, Maintenance, and Diagnostic Services for Networked Electronic Devices", Ser. No. 09/705,478, filed on Nov. 2, 2000.

BACKGROUND OF THE INVENTION

1. Field of the Invention

The present invention relates generally to home network systems, and more specifically to a system and method for downloading selected multimedia content and applications based on a home network system configuration profile.

2. Description of the Prior Art

Modern home network systems provide interoperability of a variety of different types of consumer electronics devices used in a common home environment. Examples of such devices include workstations, personal computers, digital televisions, Personal Video Recorders (PVR's), set-top boxes, digital video recorders, game devices, personal digital assistants (PDA's), printers, audio devices (e.g., jukebox AV systems, CD players and mini-disc players), and audio/video (AV) hard drives providing additional storage of AV data that may be streamed to other devices. Home network systems provide for sharing of the resources of each of the electronics device in order to accomplish more sophisticated applications by providing seamless exchange of instructions and AV data between the peripheral devices.

In order to handle the exchange of both commands and multiple digital AV streams, a home network must employ a networking standard that guarantees quality of service. A number of flexible home network standards have been developed. As an example, the Home Audio Video interoperability (HAVi) standard, developed by eight major Consumer Electronics companies including Sony Corporation, provides a home network architecture is open, scaleable in implementation complexity, platform independent, and language neutral. The HAVi architecture uses the digital IEEE-1394 serial interface standard which is a high speed bus that meets the required multimedia bandwidth requirements and provides quality of service. HAVi is based on the IEEE-1394 standard, to allow devices to send and receive digital commands and streams of digital AV content at speeds up to 400 Mbps. Other home networks use Ethernet.

It is common that at least one of the devices in a home network system, such as a PC, will be configured to access the Internet. The Open Services Gateway Initiative (OSGi) is an industry group working to define and promote an open standard for connecting the coming generation of smart consumer and small business appliances with commercial Internet services. The Open Services Gateway specification will provide a common foundation for Internet Service Providers, network operators and equipment manufacturers to deliver a wide range of e-services via gateway servers running in the home or remote office. However, there as yet no system and method for providing e-services for operating, maintaining, and diagnosing problems associated with consumer electronic devices via gateway servers running in the home or remote office.

The benefit of a network of interoperable devices is that the whole is greater than the sum of all the components. Home networks enable sharing of device resources in order to accomplish sophisticated applications by providing seamless exchange of instructions and AV data between electronic devices in the home network. Home network systems typically allow for configuring at least one device (e.g., a personal computer system) to be a controlling device that is operative to provide for remotely controlling other electronic devices in the home network system. For example, a user may program a recording on a VCR following a menu generated by the TV on the TV screen.

In HAVi standard home networks, there is no single controlling device. Any device in the network that has been designed to do so can control other devices. In order for a controlling device to control a particular controlled device in a home network, the controlling device must be able to access a particular application having instructions executable by the controlling device for controlling a particular controlled device, or providing other services associated with the device.

Some of the electronic devices in a home network system may be packaged and sold with a disk having an associated control application stored thereon for controlling the device. For these devices, the control application could be loaded to the controlling device from the disk. However, for other electronic devices, it may be that no compatible application is available.

The types of applications and media contents which may be used in a particular home network system depends on the particular configuration and capabilities of the system. Each home network system may include different types of consumer electronic devices and different types of means for interconnecting the devices. Adding new electronics devices to a home network system often expands the capabilities of the home network to execute different types of applications and media content. Because there are so many different configurations for a home network system, it is difficult for a user to be able to determine what types of applications and media content may be used in his or her home network as it is currently configured.

What is needed is a system and method for identifying and accessing applications and media content that may be used in a particular home network system.

SUMMARY OF THE INVENTION

It is an object of the present invention to provide a system and method for identifying and accessing applications and media content that may be used in a particular home network system.

Briefly, a presently preferred embodiment of the present invention provides a system and method of identifying, accessing, and managing service applications for use with associated consumer electronic devices in a home network system. A client side process, executed by a client computing system in the home network system, operates in conjunction with a server side process executed by a server computing system that is communicatively coupled with the client computing system via the Internet. In one embodiment, the client computing system is implemented by a gateway device communicatively coupled with each of the electronic devices via the home network. The gateway device is operative to access the Internet and is communicatively coupled with a display unit.

The client side process includes the steps of: determining device ID information associated with at least one selected one of the consumer electronic devices in the home network system; determining a home network system configuration profile based at least on the device ID information; providing the home network system configuration profile to a selected server computing system via the Internet; downloading an application from the selected server computing system, the application being operative to provide a process associated with the selected electronic devices; and executing the downloaded application at the gateway device to provide a remote interactive process associated with the selected electronic devices.

The home network system configuration profile may also be determined based on additional home network configuration parameters including the bandwidth capacity of the home network, a user profile for a user of the home network system, a history of use of the home network system, a total storage capacity of memory devices available in the home network system, content decoding capabilities available in the home network system, security and decryption capabilities available in the home network system.

In an embodiment, the device ID information associated with each of the selected electronic devices includes vendor information indicative of a vendor of the associated device, model information indicative of the model of the associated device, and a serial number of the associated device.

In one embodiment, the device ID information identifies at least two selected consumer electronic devices in the home network system. In this embodiment, the downloaded application is a device interplay application that is operative to provide synergistic functions utilizing the resources of each of the selected devices.

The server side process, executed by the server computing system, includes the steps of: receiving a home network system configuration profile from a client computing system, the profile including device ID information indicating at least one selected consumer electronic device in a home network system; determining a selected application associated with the selected devices based on the configuration profile; and providing the selected application to the client computing system, the application including instructions executable by the client computing system for providing a process associated with the selected devices.

An important advantage of the system and method of the present invention is that it automatically provides users of a home network system with applications and media content that may be used in their particular home network systems.

The foregoing and other objects, features, and advantages of the present invention will become apparent from the following detailed description of the preferred embodiment which makes reference to the several figures of the drawing.

DETAILED DESCRIPTION OF THE PREFERRED EMBODIMENTS

Figure 1:
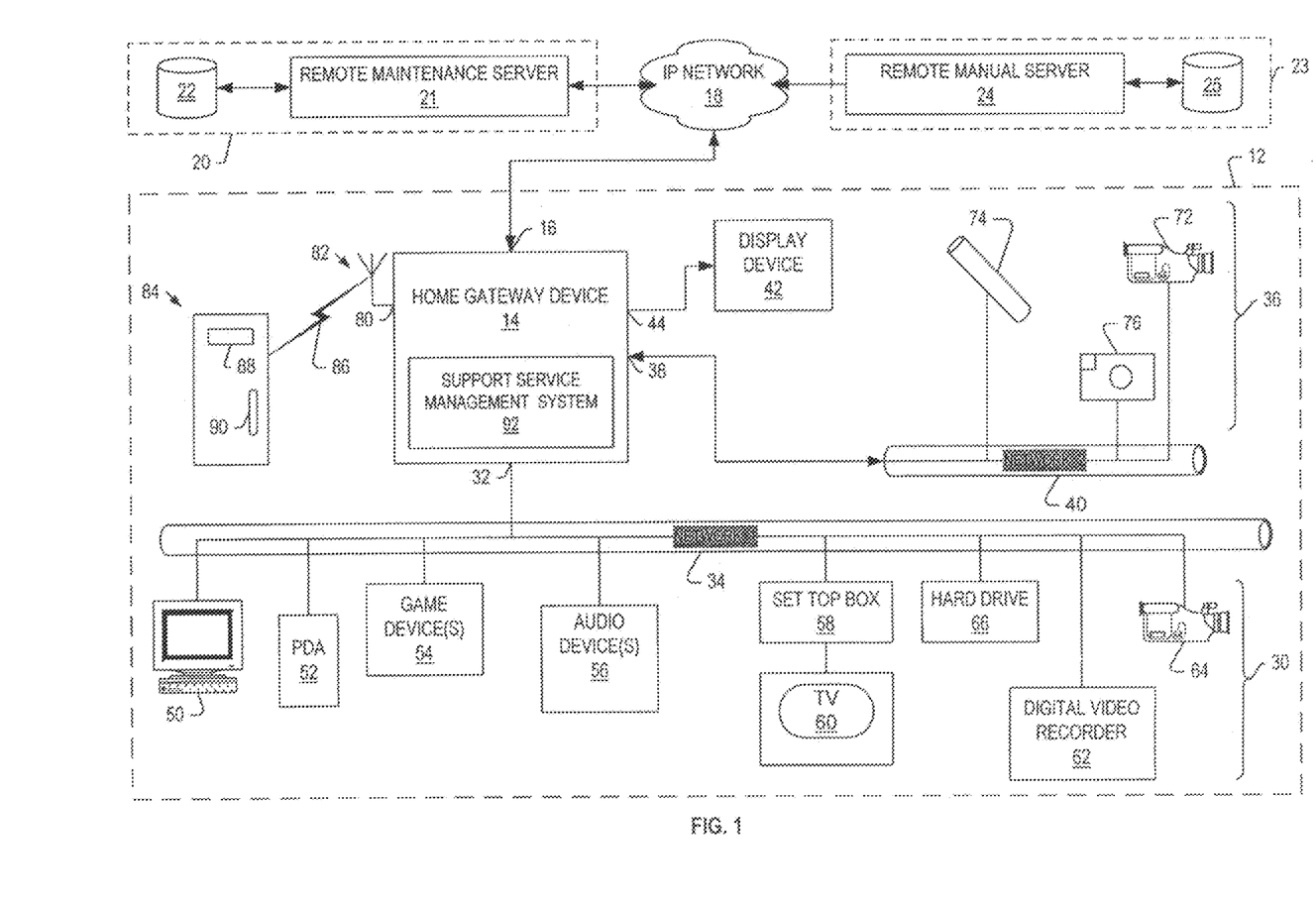
FIG. 1 is a block diagram generally illustrating a home network system including a plurality of electronic devices each being coupled with a residential gateway that is operative to access the Internet, and to provide a service management process in accordance with the present invention.

FIG. 1 shows a block diagram generally illustrating a home network system 12 including a gateway device 14 having a port 16 communicatively coupled with an internet protocol (IP) network 18 such as the Internet thereby enabling the gateway device 14 to access a plurality of different server sites including a remote manual server site 20 having a computer system 21 operative to access at least one associated database 22, and a remote manual server site 23 having a computer system 24 operative to access at least one associated database 25 as further explained below.

The home network system 12 also includes: a first group of electronic devices 30 communicatively coupled with a port 32 of the gateway device 14 via a first home network 34 designated NETWORK_1; a second group of electronic devices 36 communicatively coupled with a port 38 of the gateway device via a second home network 40 designated NETWORK_2; and a display device 42 communicatively coupled with port 44 of the gateway device. In accordance with the present invention, the first and second home networks 34 and 40 may be implemented using any technology that provides for a quality of service including reliable exchange of service application commands and timely delivery of multiple digital audio-video (AV) streams between each of the electronic devices 30 and 36 respectively, and between the gateway device 14 and the electronic devices 30 and 36 respectively. The display device 42 may be a television or any other type of display device such as a CRT or flat panel display.

In the described embodiment, NETWORK_1 is implemented in accordance with the Home Audio Video interoperability (HAVi) standard based on the digital IEEE-1394 serial interface standard which currently allows for each of the devices 30 and the gateway device 14 to send and receive service commands and streams of digital AV content at speeds up to 400 Mbps. The HAVi standard provides a home network architecture is open, scaleable, platform independent, and language neutral. Also in the described embodiment, NETWORK_2 is implemented in accordance with the universal serial bus (USB) communications standard which currently allows for each of the devices 36 and gateway device 14 to send and receive service commands and streams of digital AV content at speeds up to 12 Mbps. In an alternative embodiment, either of the networks 34 and 40 may be implemented in accordance with the Ethernet standard or any other connection providing adequate quality of service for commands and streams of digital AV content.

The first group of electronic devices 30, each of which is connected to the gateway device via NETWORK_1, include:

a first personal computer (PC) system 50 having a system memory (not shown) for storing computer readable instructions, and a processor (not shown) for executing computer readable instructions; a personal digital assistant (PDA) 52; at least one game device 54 (e.g., Sony Play Station); audio devices 56 (e.g., a compact disk player, jukebox AV system, or mini-disc player) including speakers (not shown); a set top box 58 connected to a television (TV) 60 to provide the TV with satellite/cable television services; a digital video recorder 62 (e.g., a TIVO™ system) which may use a digital cable service; a camcorder 64; and a hard disk storage device 66 providing additional storage of media assets including digital video content (e.g., MPEG format video content). The second group electronic devices 36 includes a second personal computer 70, a camcorder 72, a Sony Music clip 74, and a digital camera 76 each being a connected to the gateway device via NETWORK_2. In the described embodiment, each of the devices 36 is a USB compatible device.

The home network system 12 provides interoperability of the networked electronic devices 30, 36. The networks 30 and 36 provide quality of service connection between networked devices in order to handle the exchange of both commands and multiple digital AV streams between the devices 30, 36 and the gateway device 14. The benefit of the network 12 of interoperable devices is that it enables sharing of device resources in order to accomplish sophisticated applications by providing seamless exchange of instructions and AV data between electronic devices in the home network.

In one embodiment, the network system 12 allows for configuring at least one of the devices (e.g., a personal computer system) to be a controlling device that is operative to provide for remotely controlling other electronic devices in the home network system. For example, a user may program a recording on a VCR following a menu generated by the TV on the TV screen. In accordance with the HAVi standard, there is no single controlling device. Any device in the network that has been designed to do so can control other devices.

In order for a controlling device to control a particular controlled device in a home network, the controlling device must be able to access a particular control application having executable code for controlling the particular controlled device. Some of the electronic devices in the home network may be provided with an internal ROM unit having stored thereon an associated control application for controlling the device. For these devices, the control application may be transmitted from the controlled device to the controlling device. Also, some of the electronic devices may be packaged and sold with a disk having an associated control application stored thereon. For these devices, the application could be loaded to the controlling device from the disk. However, for other electronic devices, it may be that no compatible application is available.

The gateway device 14 further includes a port 80 communicatively coupled with an electromagnetic detector 82 that is responsive to signals transmitted by a wireless remote control device 84 via a wireless link 86. In one embodiment wherein the wireless link 86 is a radio frequency (RF) link, each of the remote control device 84 and gateway device 14 includes an RF transceiver, and the detector 82 is an RF antenna. The wireless link 86 may also be an infrared (IR) link.

As further explained below, the gateway device 14 is operative to access, load, and execute a wide variety of different types of device interplay applications providing home network services associated with selected sets of the electronic devices 30, 36 in the home network system. Each of the service applications is operative to provide synergistic functions utilizing the resources of the associated selected set of the devices 30, 36. In an embodiment, each of the service applications is operative to remotely control each device of the selected set in order to provide an interplay between the devices for the purpose of achieving synergistic functions. The device interplay applications may utilize the communicative coupling provided by the home network between the selected devices in order to exchange instructions and AV data therebetween. In one example, the device interplay application is a video editing application executed by the gateway device 14, as further explained below, for controlling the camcorder 64 and digital video recorder 62 in order to copy video data from the camcorder to the digital video recorder 62 in accordance with editing and control functions.

In one embodiment, the device interplay applications executed by the gateway device 14 provide for displaying a graphical user interface (GUI) on the display device 42 enabling a user to initiate and control the performance of the device interplay applications associated with selected sets of electronic devices in the network. As an example, the video editing application for controlling the camcorder 64 and digital video recorder 62 may be executed by the gateway device 14 to provide a GUI enabling a user to control the copying of the video data from the camcorder to the digital video recorder 62.

In another embodiment that does not require a graphical user interface, the remote control device 84 includes: a display unit 88; and a select button 90 for receiving user input. In this embodiment, the remote control device is operative to display indicia of possible actions on the display device 88, and the select button 90 is responsive to user input indicative of a selected one of the possible actions.

Note that each selected set of the devices may require a different device interplay application which may be determined based on the vendor, model number, and serial number of the devices of the selected set as further explained below. Some of the electronic devices 30 and 36 may be provided with an internal ROM unit having stored thereon an associated service application. For these devices, the service application may be transmitted from the device to the gateway and executed by the gateway as further explained below. Also, some of the electronic devices may be packaged and sold with a disk having an associated service application stored thereon. For these devices, the service application could be loaded to the gateway from the disk. However, for other electronic devices, it may be that no compatible service application is available on the local home network. As further explained below, the gateway device 14 is operative to download device interplay applications associated with selected sets of devices via the Internet.

The gateway device 14 provides the home network system 12 with access to a wide variety of different types of useful applications that are available via the IP network 18. As further explained below, the gateway device 14 is operative to access, load, and execute a wide variety of different types of applications including: device control applications, device interplay applications, remote manual support service applications, remote interactive diagnosis support service applications, and remote maintenance support service applications.

The gateway device includes a processor (shown in FIG. 2 and described below) for executing a home network device service management system 92 in accordance with the present invention. As further explained below, execution of the system 92 provides service management functions including: communicating with the devices 30, 36 of the network system 12 to identify particular applications that are compatible with selected one of the devices; accessing and downloading applications from remote servers via the Internet if required; providing a centralized graphical user interface on the display device 42 enabling a user of the home network system to select from a plurality of applications for performing services associated with corresponding ones of the devices; and executing a selected application.

In one embodiment, the gateway device 14 provides a GUI service selection menu on the display device 42 enabling a user to select a particular device and an associated application. Also in an embodiment, the wireless remote control device 54 may be used to interact with the service selection menu by providing user input indicative of a selected one of the devices and associated applications.

In the described embodiment, the service management system 92 is executed by the gateway device 14. However, in an alternative embodiment, a personal computer could be configured to provide the gateway device by being configured to access the Internet, and to execute the service management system 92. Note that in accordance with the HAVi architecture, all of the electronic devices 30 may control functions performed by other ones of the electronic devices 30 if configured to do so. Therefore, in accordance with the present invention, any of the electronic devices 30 could be configured to provide the gateway device.

Figure 2:
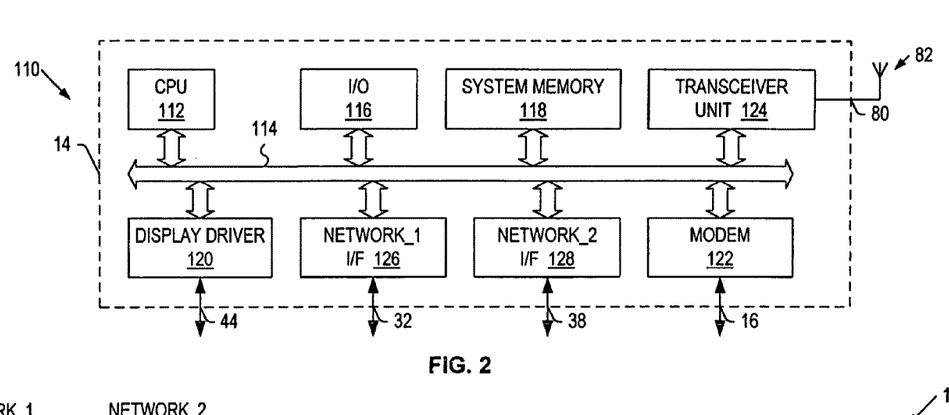
FIG. 2 is a block diagram generally illustrating hardware components of the gateway device of FIG. 1.

FIG. 2 shows a generalized block diagram illustrating components at 110 of the gateway device 14 (FIG. 1) in accordance with the present invention. The gateway device 14 generally includes: a central processing unit (CPU) 112 communicatively coupled with a system bus 114; an input/output unit 116 such as a keyboard and mouse coupled with the CPU via the system bus; a system memory unit 118 (including both volatile and non-volatile memory units) for storing computer readable instructions including instructions of the service management system 92 (FIG. 1), and being coupled with the CPU via the system bus; a display driver unit 120 for providing display data to the display device 42 (FIG. 1) via port 44 of the gateway device, and being coupled with the system bus; a modem 122 for connection with the IP network 18 (FIG. 1) via port 16 of the gateway device, and also being connected to the system bus; a transceiver unit 124 connected to the electromagnetic detector 82 via port 80, and also being connected to the system bus; a first home network interface 126 for connection with NETWORK_1 (FIG. 1) via port 32 of the gateway device, and also being connected to the system bus; and a second home network interface 128 for connection with NETWORK_2 via port 38 of the gateway device, and also being connected to the system bus.

As mentioned above, in the described embodiment, the transceiver unit 124 is an RF transceiver. As is well understood, the modem 122 may be implemented by a cable modem allowing for Internet access via cable television service, a DSL modem allowing for Internet access via plain old telephone service (POTS), or a wireless IP interface such as a Bluetooth™ wireless technology connection. In the described embodiment, the first network interface 126 is an IEEE 1394 interface, and the second network interface 128 is a USB interface.

Figure 3:
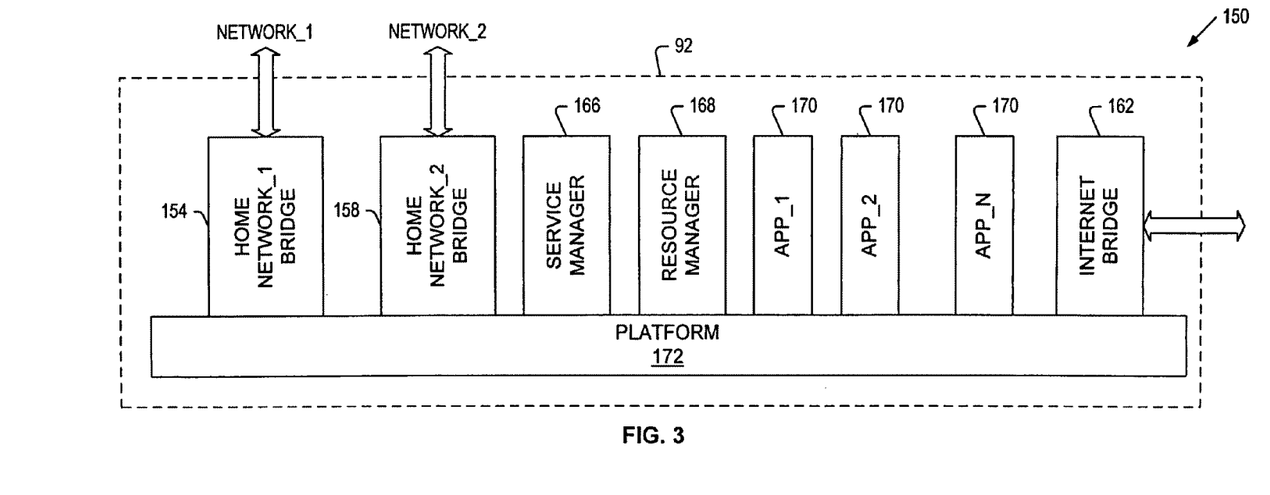
FIG. 3 is a block diagram generally illustrating software components of a service management system including: a plurality of modules having at least one home network bridge, a service manager, a resource manager, an Internet bridge, and applications associated with devices of the home network; and a platform for supporting the modules, and for dynamically loading and unloading the applications.

FIG. 3 shows a block diagram generally illustrating software components of the service management system 92 that is executed by the gateway device 14 (FIG. 1) in accordance with the described embodiment of present invention. As mentioned, the system 92 may also be executed by a personal computer system configured to access the Internet. The service management system 92 includes a plurality of modules having: a first home network bridge 154 providing an interface for communicating with each of the first group of devices 30 (FIG. 1) via NETWORK_1; a second home network bridge 158 providing an interface for communicating with each of the second group of devices 36 (FIG. 1) via NETWORK_2; an Internet network bridge 162 providing an interface for accessing Internet services via the IP network 18 (FIG. 1); a service manager 166 providing service management functions as further explained below; a resource management unit 168 for managing the limited resources of the gateway device including the system memory unit 118 and CPU 112 (FIG. 2), and resources of the display device 42 (FIG. 1); and a plurality of applications 170 designated APP_1, APP_2, . . . , APP_N each being operative to provide an associated service to at least one of the electronic devices of the home network system.

The system 92 also includes a platform 172 for supporting and providing communication between each of the modules 154, 158, 162, 166, 168, and 170. The platform 172 is also operative to dynamically load and unload the applications 170 under control of the service manager 166. The service manager 166 is operative to communicate with each of the devices 30, 36 (FIG. 1) of the home network system via the platform 172 and the bridges 154 and 158, and is also operative to communicate with server sites accessed via the Internet bridge 152 for the purpose of downloading required applications 170 as further explained below.

In one embodiment, the platform 172 includes a Java virtual machine, and each of the applications 170 is an application bundle that may be interpretively executed by the Java virtual machine. In an alternative embodiment wherein the platform 172 is a Java virtual machine, each of the applications 170 may be an applet, or a Havlet which is a Java applet defined in accordance with the HAVi standard. In one embodiment, each of the applications 170 is downloaded from a server via the IP network under control of the service manager 166, and stored in volatile memory of the gateway device. In another embodiment, each of the applications 170 may be downloaded and stored in the gateway device system memory 118 (FIG. 2) for later use.

Service management functions provided by the service manager 166 include: communicating with each of the electronic devices of the home network system via the home network bridges 154 and 158 in order to determine device ID information; accessing applications from remote servers via the Internet 18 (FIG. 1) in response to messages received from the devices and/or user input as further explained below; generating a mapping between the electronic devices and applications; providing a GUI service selection menu on the display device enabling a user to select an application for providing processes associated with at least one of the devices of the home network system; and dynamically loading and unloading selected ones of the applications 170 to initiate the performance of processes associated with the selected devices.

As mentioned above, each of the applications 170 includes computer readable and executable instructions for providing a particular process associated with at least one of the electronic devices of the home network system. A plurality of applications 170 may be stored in the system memory unit 118 (FIG. 2). As mentioned, applications needed for providing specific services for associated devices may or may not be available in the system memory unit. When a new device is connected to the home network system 12 (FIG. 1) by connecting it to one of the first and second home networks 34 and 40 (FIG. 1), the new device is detected by the associated one of the home network bridges 154 and 158 in accordance with a process further explained below. Device ID information indicative of the vendor, model number, and serial number of the new device is determined by the associated network bridge and provided to the service manager 166 which is operative to determine whether any applications 170 that are compatible with the new device (either alone or in combination with any other device) are stored in the system memory unit 118. If not, the service manager 166 accesses a server computing system 22 (FIG. 1) via the Internet to download an application.

The applications provided by the server computing system 22 (FIG. 1) include: device control applications for remotely controlling associated ones of the electronic devices; device interplay applications that are operative to provide synergistic functions utilizing the resources of each a selected set of the devices; remote manual support service applications for helping users to learn how to use associated devices; remote interactive diagnosis support service applications enabling a user to remotely and/or interactively diagnose problems with associated devices; and remote maintenance support service applications providing for the performance of remote maintenance functions on associated devices.

Figure 4:
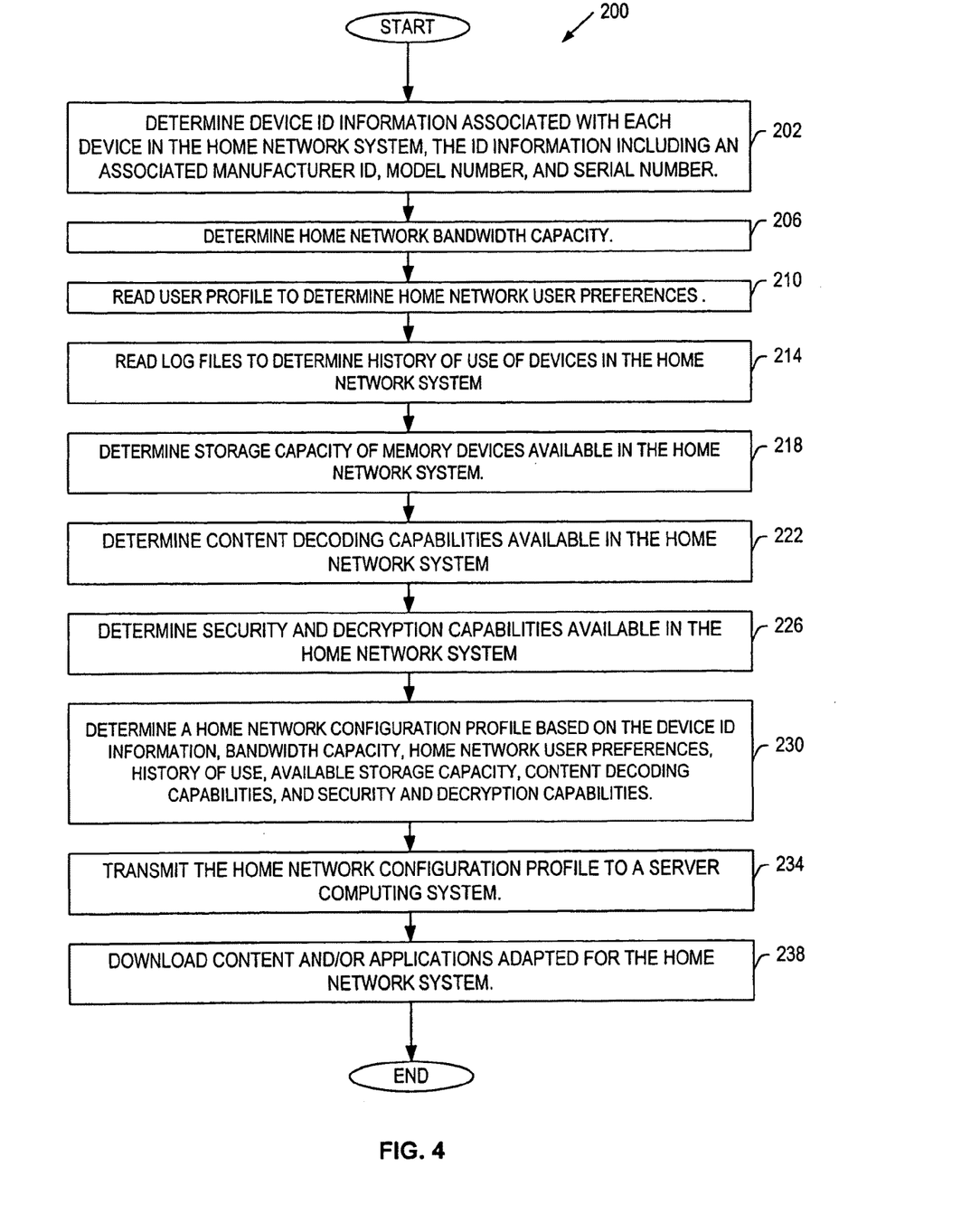
FIG. 4 is a flow diagram generally illustrating a client side process in accordance with the present invention for identifying and accessing selected multimedia content and applications based on a home network system configuration profile.

FIG. 4 shows a flow diagram generally illustrating an exemplary client-side process at 200 for identifying and accessing applications and media content for use in a home network system in accordance with the present invention. In the described embodiment, the process is implemented by the content/application download system 92 (FIG. 3).

The process 200 begins with a step 202 in which the system determines device ID information associated with each of the devices 30, 36 (FIG. 1) in the home network system. In an embodiment, the device ID information includes an associated manufacturer ID, model number, and serial number. The device ID information may be determine by the system 92 (FIG. 3) by communicating with each of the devices via the home network. In steps 206 through 226, the system determines a plurality of home network configuration parameters that may be used to describe the current configuration of the home network system.

In step 206, the system determines the bandwidth capacity of one of the home network 34, 40 (FIG. 1). For example, in the embodiment wherein NETWORK_1 is a HAVi standard network, the bandwidth capacity of NETWORK_1 can be 400 Mbps. In step 210, the system reads a user profile to determine home network user preferences. In one embodiment, the home network user preferences may be selected by a user using a user preferences Wizard which is a software module enabling the user to select preferences. User preferences may also be determined based on a user profile that is automatically generated based on media content previously accessed by the user in the home network system.

In step 214, the system reads log files to determine a history of use of the devices 30, 36 (FIG. 1) in the home network. The log files, which may be stored in the system memory unit of the gateway device, include information indicating applications and media contents previously used in the home network system.

In step 218, the system determines the storage capacity of memory devices (e.g., the hard drive 66 of FIG. 1, and memory storage capacity in the personal computer system 50 of FIG. 1) available in the home network system. In step 222, the system determines content decoding capabilities in the home network system. As an example, the personal computer system 50 (FIG. 1) may have applications for reading JPEG files, GIF files, or any other file types. In step 226, the system determines security and decryption capabilities available in the home network system.

In step 230, the system determines a home network configuration profile based on the device ID information, the bandwidth capacity, the home network user preferences, the history of use, the available storage capacity, the content decoding capabilities, and the security and decryption capabilities.

In step 234, the system transmits the home network configuration profile to a server computing system such as the server computing system 22 (FIG. 1) via the IP network 18. In step 238, the system downloads content and applications adapted for use in the home network system. The downloaded applications may include device control applications for remotely controlling associated ones of the electronic devices 30, 36 (FIG. 1), device interplay applications that are operative to provide synergistic functions utilizing the resources of each a selected set of the devices, remote manual support service applications for helping users to learn how to use associated devices, remote interactive diagnosis support service applications, and remote maintenance support service applications.

Figure 5:
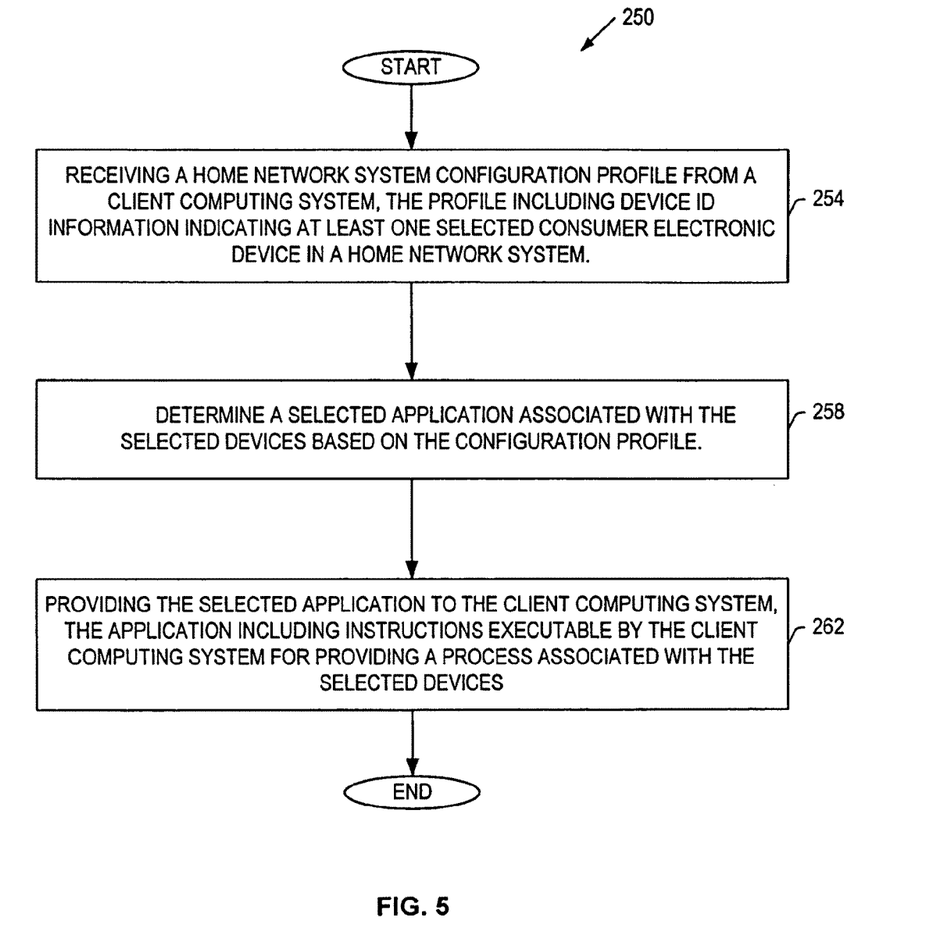
FIG. 5 is a flow diagram generally illustrating a service side process in accordance with the present invention for identifying and providing selected multimedia content and applications based on a home network system configuration profile.

FIG. 5 shows a flow diagram generally illustrating an exemplary server-side support service process at 250 that is executed by a server computing system 22 (FIG. 1) in conjunction with execution of the client-side support service process 200 (FIG. 4). In step 254, the server computing system receives a home network system configuration profile from a client computing system. The profile includes device ID information indicating at least one selected consumer electronic device 30, 36 (FIG. 1) in a home network system. In step 258, the system determines a selected application and/or media content associated with the selected devices based on the configuration profile. In step 262, the system provides the selected application and/or media content to the client computing system.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A process of identifying and managing applications comprising:
    determining device identification information associated with at least one electronic device included in a home network;
    determining a home network configuration profile based at least on said device identification information, wherein the home network configuration profile comprises a plurality of home network configuration parameters;
    providing said home network configuration profile to a server, wherein the server is remote from the home network;
    based on the provided home network configuration profile, automatically downloading an application from the server to the home network, the application being operative to provide to the or each electronic device, a control application, an interface application, a device interplay application, a support application, a diagnostic application, or a maintenance application; and
    executing said downloaded application within the home network.

2. A process of identifying and managing applications as recited in claim 1 further comprising determining a bandwidth capacity of the home network, and wherein determining a home network configuration profile further includes determining said home network configuration profile based on said bandwidth capacity.

3. A process of identifying and managing applications as recited in claim 1 further comprising determining a user profile for a user of the home network, and wherein determining a home network configuration profile further includes determining said home network configuration profile based on said user profile.

4. A process of identifying and managing applications as recited in claim 1 further comprising determining a history of use of the home network, the history of use including used application information and media content information, and wherein determining a home network configuration profile further includes determining said home network configuration profile based on said history of use.

5. A process of identifying and managing applications as recited in claim 1 further comprising determining storage capacity of at least one memory device available in the home network, and wherein determining a home network configuration profile further includes determining said home network configuration profile based on said storage capacity.

6. A process of identifying and managing applications as recited in claim 1 further comprising determining at least one content decoding capability available in the home network, and wherein determining a home network configuration profile further includes determining said home network configuration profile based on said content decoding capability.

7. A process of identifying and managing applications as recited in claim 1 further comprising determining at least one security and decryption capability available in the home network, and wherein determining a home network configuration profile further includes determining said home network configuration profile based on said security and decryption capability.

8. A process of identifying and managing applications as recited in claim 1 wherein automatically downloading an application comprises:
determining a search key based on said device identification information; and
using said search key to query said server for an application associated with the electronic device.

9. A process of identifying and managing applications as recited in claim 1 wherein said device identification information identifies at least two electronic devices in the home network, and wherein said downloaded application comprises a device interplay application that utilizes resources of each of the at least two electronic devices.

10. A process of identifying and managing applications as recited in claim 1 wherein said downloaded application is operative to remotely control the electronic device.

11. A process of identifying and managing applications as recited in claim 1 wherein the home network provides for communicative coupling between the electronic devices within the home network in order to exchange instructions and audio-visual data between or among the electronic devices within the home network.

12. A process of identifying and managing applications as recited in claim 1 further comprising automatically downloading content from the server to be output by at least one of the electronic devices.

13. A process as recited in claim 1 wherein said home network configuration profile further comprises information indicating a bandwidth capacity of the home network.

14. A process as recited in claim 1 wherein said home network configuration profile further comprises information indicating a user profile for a user of the home network.

15. A process as recited in claim 1 wherein said home network configuration profile further comprises information indicating a history of use of the home network, the history of use including used application information and media content information.

16. A process as recited in claim 1 wherein said home network configuration profile further comprises information indicating a total storage capacity of memory devices available in the home network.

17. A process of identifying and accessing media content comprising:
determining device identification information associated with at least one electronic device included in a home network;
determining a home network configuration profile based at least on a plurality of home network configuration parameters including said device identification information;
providing said home network configuration profile to a server, wherein the server is remote from the home network; and
based on the provided home network configuration profile, automatically downloading media content from the server to be output by at least one electronic device.

18. A process of identifying and accessing media content as recited in claim 17 further comprising determining a bandwidth capacity of the home network, and wherein determining a home network configuration profile further includes determining said home network configuration profile based on said bandwidth capacity.

19. A process of identifying and accessing media content as recited in claim 17 further comprising determining a user profile for a user of the home network, and wherein determining a home network configuration profile further includes determining said home network configuration profile based on said user profile.

20. A process of identifying and accessing media content as recited in claim 17 further comprising determining a history of use of the home network, the history of use including used application information and media content information, and wherein determining a home network configuration profile further includes determining said home network configuration profile based on said history of use.

21. A process of identifying and accessing media content as recited in claim 17 further comprising determining a storage capacity of at least one memory device available in the home network, and wherein determining a home network configuration profile further includes determining said home network configuration profile based on said storage capacity.

22. A process of identifying and accessing media content as recited in claim 17 further comprising determining at least one content decoding capability available in the home network, and wherein determining a home network configuration profile further includes determining said home network configuration profile based on said content decoding capability.

23. A process of identifying and accessing media content as recited in claim 17 further comprising determining at least one security and decryption capability available in the home network, and wherein determining a home network configuration profile further includes determining said home network configuration profile based on said security and decryption capability.

24. A process of identifying and accessing media content as recited in claim 17 wherein automatically downloading selected media comprises:
determining a search key based on said device identification information; and using said search key to query said server for media content.

25. An electronic device coupled to a network of devices comprising:
a communications interface through which the electronic device communicates with a remote server;
a network communications interface through which the electronic device communicates with devices within the network of devices, wherein the electronic device communicates with the devices within the network of devices to determine device identification information for one or more of the devices and a configuration profile of the one or more of the devices, the configuration profile including a plurality of home network configuration parameters, further wherein the electronic device automatically provides the configuration profile to the remote server through the communications interface and, based on the provided configuration profile, automatically downloads an application from the remote server, the application being associated with the one or more of the devices; and
a processing circuit coupled to the communications interface and the network communications interface for executing the application to provide to the one or more devices, a control application, an interface application, a device interplay application, a support application, a diagnostic application, or a maintenance application.

26. The electronic device as claimed in claim 25 wherein the configuration profile is based on bandwidth capacity.

27. The electronic device as claimed in claim 25 wherein the configuration profile is based on a user profile for a user of the network of devices.

28. The electronic device as claimed in claim 25 wherein the configuration profile is based on a history of use of the network of devices, the history of use including used application information and media content information.

29. The electronic device as claimed in claim 25 wherein the configuration profile is based on total storage capacity of at least one memory device available in the network of devices.

30. The electronic device as claimed in claim 25 wherein the configuration profile is based on at least one content decoding capability within the network of devices.

31. The electronic device as claimed in claim 25 wherein the configuration profile is based on at least one security and decryption capability available within the network of devices.

32. A gaming console gateway device coupled to a network of devices comprising:

a communications interface through which the gaming console gateway device communicates with a remote server; and
a network communications interface through which the gaming console gateway device communicates with devices within the network of devices, wherein the gaming console gateway device communicates with the devices within the network of devices to determine device identification information for one or more of the devices and a configuration profile of the one or more of the devices, the configuration profile including a plurality of home network configuration parameters, further wherein the gaming console gateway device automatically provides the configuration profile to the remote server through the communications interface and, based on the provided configuration profile, automatically downloads an application from the remote server, the application being associated with the one or more of the devices.

33. The gaming console gateway device as claimed in claim 32 wherein the configuration profile is based on bandwidth capacity.

34. The gaming console gateway device as claimed in claim 32 wherein the configuration profile is based on a user profile for a user of the network of devices.

35. The gaming console gateway device as claimed in claim 32 wherein the configuration profile is based on a history of use of the network of devices, the history of use including used application information and media content information.

36. The gaming console gateway device as claimed in claim 32 wherein the configuration profile is based on total storage capacity of at least one memory device available in the network of devices.

37. The gaming console gateway device as claimed in claim 32 wherein the configuration profile is based on at least one content decoding capability within the network of devices.

38. The gaming console gateway device as claimed in claim 32 wherein the configuration profile is based on at least one security and decryption capability available within the network of devices.

39. A process of identifying and managing applications as recited in claim 1 wherein the downloaded application is executed at a gateway device.

40. The electronic device as claimed in claim 25 wherein the electronic device comprises a gateway device.

* * * * *